US012116949B2

(12) United States Patent
Beyerer et al.

(10) Patent No.: US 12,116,949 B2
(45) Date of Patent: Oct. 15, 2024

(54) AUXILIARY ENGINE CONTROL UNIT, IN PARTICULAR AN ADAPTIVE AUXILIARY ENGINE CONTROL UNIT, FOR USE WITH A MAIN ENGINE CONTROL UNIT OR AN INTERNAL COMBUSTION ENGINE, IN PARTICULAR AN INTERNAL COMBUSTION ENGINE OF A VEHICLE

(71) Applicant: Fraunhofer-Gesellschaft zur Förderung der Angewandten Forschung E.V., Munich (DE)

(72) Inventors: Jürgen Beyerer, Karlsruhe (DE); Julius Pfrommer, Karlsruhe (DE); Lars Wessels, Karlsruhe (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/252,722

(22) PCT Filed: Nov. 11, 2021

(86) PCT No.: PCT/EP2021/081312
§ 371 (c)(1),
(2) Date: May 12, 2023

(87) PCT Pub. No.: WO2022/101308
PCT Pub. Date: May 19, 2022

(65) Prior Publication Data

US 2023/0399993 A1 Dec. 14, 2023

(30) Foreign Application Priority Data

Nov. 12, 2020 (DE) ..................... 10 2020 214 257.2

(51) Int. Cl.
*F02D 41/26* (2006.01)
*F02D 41/14* (2006.01)

(52) U.S. Cl.
CPC ....... *F02D 41/266* (2013.01); *F02D 41/1402* (2013.01)

(58) Field of Classification Search
CPC ............... F02D 41/266; F02D 41/1402; F02D 41/0007; F02D 41/1406; F02D 37/02
(Continued)

(56) References Cited

U.S. PATENT DOCUMENTS 10,087,871 B2 * 10/2018 Botting ............... F02D 41/1497
2006/0074542 A1 4/2006 Kikutani
(Continued)

FOREIGN PATENT DOCUMENTS

WO 2012089618 A1 7/2012

OTHER PUBLICATIONS

European Patent Office, International Search Report and Written Opinion in Application No. PCT/EP2021/081312, dated Feb. 24, 2022, 12 pages, Rijswijk, Netherlands.

*Primary Examiner* — Hai H Huynh
(74) *Attorney, Agent, or Firm* — Marshall & Melhorn, LLC

(57) ABSTRACT

An auxiliary engine control unit for use with a main engine control unit for an internal combustion engine of a vehicle may have an input signal interface unit. The input signal interface unit may be configured to intercept at least one engine control output signal of the main engine control unit. The auxiliary engine control unit may also have a control unit which is configured to change the intercepted engine control output signal according to a control scheme stored in the control unit. The auxiliary engine control unit may also have an output signal interface unit which is configured to
(Continued)

output the engine control output signal, changed by the control unit, to the internal combustion engine to be controlled in order to achieve an improved control of the internal combustion engine.

12 Claims, 1 Drawing Sheet

(58) Field of Classification Search
USPC ......... 701/103–105, 110–113; 123/399, 472, 123/478–480, 90.11, 406.19
See application file for complete search history.

(56) References Cited

U.S. PATENT DOCUMENTS

| | | | |
|---|---|---|---|
| 2012/0065867 | A1 | 3/2012 | Dobeck et al. |
| 2018/0179982 | A1 | 6/2018 | Botting et al. |

* cited by examiner

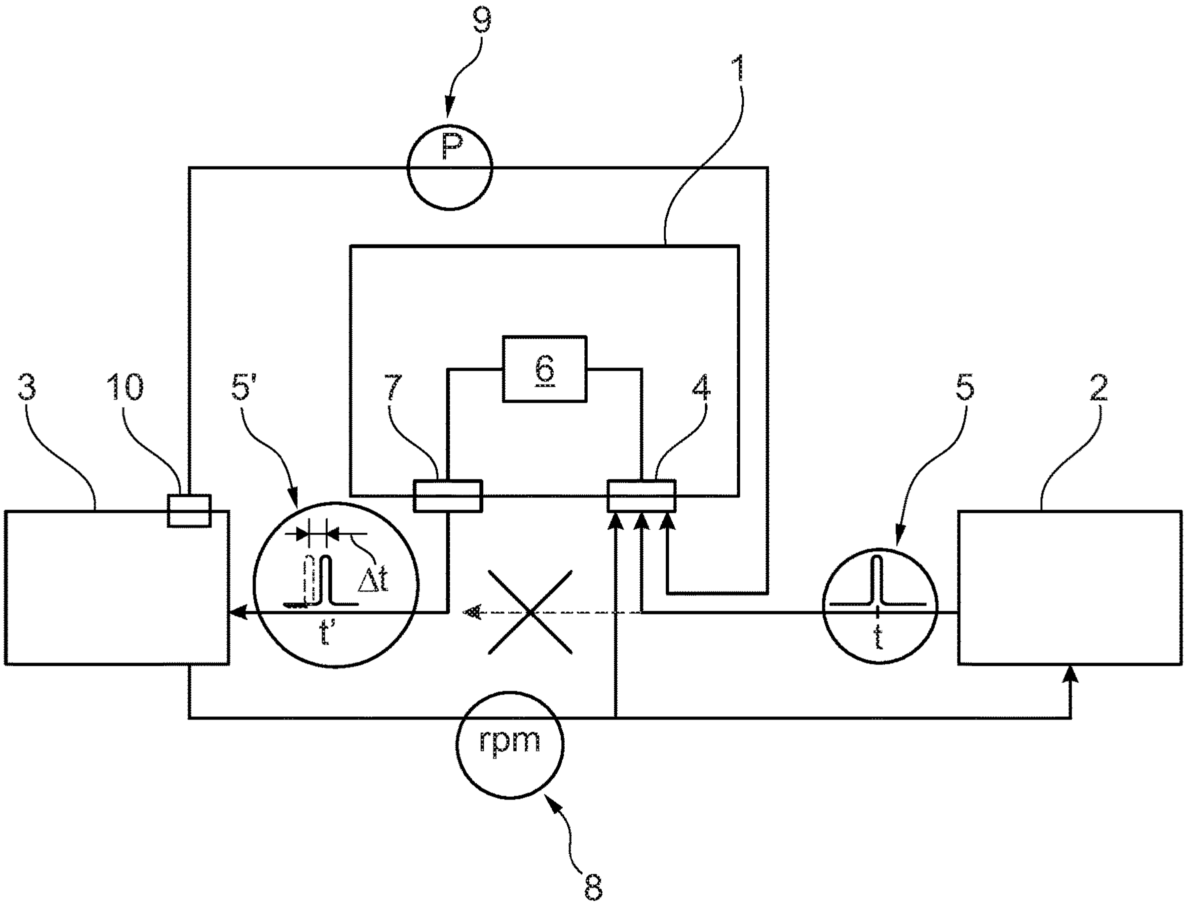
9
P
1
6
3
10
5'
7
4
5
2
Δt
t'
t
rpm
8

AUXILIARY ENGINE CONTROL UNIT, IN PARTICULAR AN ADAPTIVE AUXILIARY ENGINE CONTROL UNIT, FOR USE WITH A MAIN ENGINE CONTROL UNIT OR AN INTERNAL COMBUSTION ENGINE, IN PARTICULAR AN INTERNAL COMBUSTION ENGINE OF A VEHICLE

FIELD

The invention relates to an auxiliary engine control unit for use with a main engine control unit for an internal combustion engine of a vehicle, in particular a drive internal combustion engine of a vehicle, wherein the main engine control unit is configured to set, i.e., to control and/or to regulate the internal combustion engine by means of corresponding engine control output signals.

BACKGROUND

Conventional engine control units for internal combustion engines in vehicles, subsequently referred to as a main engine control unit, control or regulate the internal combustion engine, usually a drive internal combustion engine, in an associated vehicle using engine control output signals, which are transmitted to the internal combustion engine to control and/or regulate the same.

The suitable engine control output signals are thereby determined by the main engine control unit from engine control input signals by means of a control scheme stored in the main engine control unit, for example, a high-dimensional (operating parameter) map. The internal combustion engine may thus be set as a function of a plurality of different operating parameters, which are reflected in the engine control input signals.

However, many of the common main engine control units only use a relatively low number of operating parameters and/or are configured with their control scheme as a compromise to a very specific “average environment” or an “average surroundings”. Due to this, an optimum control of the internal combustion engine with respect to predetermined optimization parameters, for example, with respect to a torque response, fuel consumption, and/or exhaust gas composition, is impossible, as the “average environment” deviates by definition from the specifically present environment. At the same time, the development of new main engine control units, which overcome the stated problems, are slowed by an extremely complex certification and testing process, which primarily functions to prevent the internal combustion engine from reaching dangerous operating states. Thus, a large macroeconomic benefit and a relatively small commercial benefit are confronted with high commercial costs.

SUMMARY

Thus, the underlying object of the present invention is to provide an engine control, with which the stated problems may be overcome and thus an improved control of an internal combustion engine is achieved.

This problem is solved by the subject matter of the independent patent claims. Advantageous embodiments result from the dependent patent claims, the description, and the FIGURE.

One aspect relates to an auxiliary engine control unit for use with, thus in addition to, a main engine control unit, wherein both engine control units are configured for use with an internal combustion engine, in particular for use with an internal combustion engine of a vehicle, like a passenger car and/or a truck, or are installed in such a vehicle. Alternatively, the auxiliary engine control unit may also be configured for use with stationary internal combustion engines, for example, in a generator. The auxiliary engine control unit may also be designated as a supplemental engine control unit or a retrofit engine control unit.

The auxiliary engine control unit thereby has an input signal interface unit, which is configured to intercept an engine control output signal of the main engine control unit, i.e., to tap into the signal with the goal of replacing it. The engine control output signal of the main engine control unit is thereby configured to control the internal combustion engine, which may include here and subsequently a regulation of the internal combustion engine. The one or more engine control output signals may thereby be present, in particular, in the form of voltage. In the case of multiple engine control output signals, only one part of the engine control output signals may also be present in the form of a voltage, however, in particular, all engine control output signals may be present in the form of a voltage. The engine control output signals, not present in the form of a voltage, may respectively be or comprise a digital signal sequence, a command. All engine control output signals may also be a command or may comprise one of the same. In particular, the engine control output signal(s) of the main engine control unit may represent or comprise a respective throttle valve position and/or a respective fuel injection amount and/or a respective ignition timing and/or a respective valve opening and/or valve closing timing and/or a turbocharger charge specification. The use of a turbocharger may be controlled with the turbocharger charge specification. The fuel injection amount may thereby be predetermined by a starting time of an injection process and/or a duration of the injection process, in particular at an unchanged injection amount per time interval. The throttle valve position may be a throttle valve position that is adjustable in the medium-term. The engine control output signal may represent or comprise a phase adjuster, the valve opening time.

The auxiliary engine control unit also comprises a control unit which is configured to change the intercepted engine control output signal according to a predetermined control scheme stored in the control unit. Changing the intercepted engine control output signal may also comprise, in the case of multiple engine control output signals, changing a part of the engine control output signals, that is, one or more of the engine control output signals, in which case one or several unchanged intercepted engine control output signals are output unchanged via the (subsequently described) output signal interface unit to the internal combustion engine to be controlled. The control scheme of the auxiliary engine control unit may likewise be present here in the form of a(n) (operating parameter) map. The already mentioned output signal interface unit of the auxiliary engine control unit is configured to output the engine control output signal, changed by the control unit, to the internal combustion engine to be thus jointly controlled by the auxiliary and main engine control units. The auxiliary engine control unit is thus configured, as a whole, to change an already suitable engine control output signal of the main engine control unit for controlling the internal combustion engine so that the control of the internal combustion engine may be readjusted, independently of the main engine control unit, in order to achieve an optimum control in the respectively specifically present surroundings.

This has the advantage that additional parameters, which the main engine control unit may not consider, may also be considered during the control of the internal combustion engine, and thus also an optimization of the internal combustion engine for environmental or surroundings influences, which are changing during operation of the internal combustion engine and which may not be considered by the main engine control unit, and thus the best possible achievable combustion result is respectively achieved according to an optimization criterion. These advantages may thereby be achieved not only without complex safety certification, as is required for the main engine control unit, but may also be subsequently achieved in already delivered or fully constructed vehicles or internal combustion engines with a corresponding, fixedly predetermined main engine control unit. The comprehensive safety certification is not necessary, as the auxiliary engine control unit may be limited to fine adjustments, i.e., the internal combustion engine in a state space is always maintained in a sufficiently small area of the known safe states.

In one advantageous embodiment, the change here comprises a change, i.e., an increase and/or decrease, of an amplitude value of the engine control output signal by a predetermined or predeterminable value, and/or a change of a time characteristic or time value (a timing) of the engine control output signal by a predetermined or predeterminable value, i.e., a temporal delay and/or a temporal acceleration or advancement. The time characteristic designates here a precisely predetermined time characteristic relative to the operating cycle of the internal combustion engine, and relates to an engine control output signal, whose control effect depends on the precise point in time at which the engine control output signal arrives at the internal combustion engine. In contrast, changing the amplitude value of the engine control output signal relates to an engine control output signal, whose control effect is achieved by the amplitude of the signal. Correspondingly, the increase or decrease relates to a change of a voltage maximum value, in particular and/or correspondingly, the delay and/or acceleration relates to a change of a time specification or a timing for a voltage maximum value. One example for an engine control output signal, whose predetermined amplitude value is used for controlling the internal combustion engine, is a throttle valve position; one example for an engine control output signal, whose predetermined time characteristic achieves a control effect, is here the ignition timing. This type of change has the advantage that the engine control output signals may be changed very quickly, as only small difference values must be added or subtracted to/from control variables already provided by the main engine control unit, or a voltage maximum value, in this case a voltage pulse, must be correspondingly briefly delayed. One possible implementation of the temporal advancement of a voltage maximum value is subsequently described.

In one particularly advantageous embodiment, when the change of the time characteristic by a predetermined value comprises a temporal advancement of a voltage maximum value by the predefined value, the control unit is configured to output the changed engine control output signal to the internal combustion engine in the form of the accelerated voltage maximum value, i.e., advanced in its relative timing, only in a subsequent, in particular, in the next operating cycle of the internal combustion engine. In this case, the unchanged engine control output signal is thus initially output (looped through). This is based on the recognition that, due to the plurality of operating cycles to be run through per unit of time, for example, a minute, the advantage of the relatively earlier engine control output signal may outweigh the disadvantages of the readjustment, which, when viewed absolutely, is delayed by one or more cycles. Thus, an improved combustion in the internal combustion engine may also be achieved by a delayed temporal advancement.

In another particularly advantageous embodiment, the control unit is configured to change the intercepted engine control output signal at most by a predetermined limit amount, in particular at most by a respective limit amount specifically predetermined for the respective engine control output signal. The limit amount may thereby be relatively determined, for example, using an upper limit of at most 10% of the value to be changed, or it may be absolutely determined. Thus, different limit amounts may be predetermined for different engine control output signals, for example, a change of at most 10% for a first engine control output signal, a change of at most 7% for a second engine control output signal, and a change of at most 0.2 volts for a third engine control output signal, and a change of at most 7 msec for a fourth engine control output signal. This has the advantage that, using the limit amount, the sufficiently small area of the safe operating states already mentioned above may be limited in a state space of the internal combustion engine, so that it is effectively prevented that the internal combustion engine becomes non-functional or even dangerous for the area.

In another advantageous embodiment, the input signal interface unit is configured to tap at least one engine control input signal of the main engine control unit, and that a control scheme, stored in the auxiliary engine control unit, functionally depends on the intercepted engine control input signal. The engine control input signal may thereby comprise or represent, in particular, an engine rpm and/or a throttle valve position and/or a fuel injection amount and/or a residual combustion gas amount and/or an ignition timing and/or a valve opening and valve closing time and/or turbocharger charge specification and/or an engine temperature and/or an intake-side gas mixture pressure and/or a pressure in the combustion chamber and/or an exhaust-side gas mixture pressure and/or an engine torque and/or an engine mileage. The fuel injection amount may thereby be predetermined by a starting time of an injection process and/or a duration of the injection process, in particular at an unchanged injection amount per time interval. The throttle valve position may be a throttle valve position that is adjustable in the medium-term. The engine control input signal may represent or comprise a phase adjuster, the valve opening time.

This has the advantage that the readjustment or change or adaptation of the engine control output signals by the auxiliary engine control unit may be more precise and carried out better, as the control unit of the auxiliary engine control unit may use the engine control input signals of the main engine control unit as additional parameters. In particular, if the control unit of the auxiliary engine control unit is an adaptive control unit, then it may also learn the control behavior of the main engine control unit and thus control the internal combustion engine even better after a corresponding learning process. For example, after a predetermined reliability is achieved, the change of the time characteristic, in the sense of an acceleration of a signal, may also thus be implemented directly in the current working cycle of the internal combustion engine and not just in the following one. If the auxiliary engine control unit has completely learned the behavior of the main engine control unit, the main engine control unit may additionally also be completely removed.

In another particularly advantageous embodiment, the input signal interface unit is configured to tap at least one additional sensor signal, which may be provided wirelessly and/or hardwired from one additional sensor of the drive internal combustion engine and/or from an additional sensor of the vehicle and/or from an additional sensor of a surroundings of the vehicle to the auxiliary engine control unit. The auxiliary engine control unit may thus improve the control of the internal combustion engine, independently of whether, for example the engine control input signals of the main engine control unit are available. Vehicles or internal combustion engines may thus also be equipped with additional sensors, whose data may be used for improving the internal combustion engine control. For example, high-resolution pressure data from the combustion chamber may be made available via modified spark plugs, which have a piezo crystal for high-resolution pressure measurement in the combustion chamber, however, conventional main engine control units may not be able to consider this data. Using the corresponding auxiliary engine control unit, this new knowledge may be easily included in an improved engine control. The auxiliary engine control unit may thus also use sensor signals from other internal combustion engines and/or other vehicles, and thus, for example, adjust the stored control scheme to changing environmental conditions, like a changed air pressure or changed humidity, or an expected change, like a prospective change of the air pressure or a prospective change of the humidity, for example, as a function of a route set in a navigation system.

In another advantageous embodiment, the control unit has a fault detection module, which is configured to detect a fault in the interaction of the auxiliary engine control unit with the main engine control unit, and which is configured, in this case, to suspend the change of the engine control output signal of the main engine control unit at least temporarily, in particular up to an automatic or manual signal. A fault criterion may be predetermined in the control unit to detect the fault. For example, the detection module may be configured to detect a fault, if a temporary development in amplitude value or a timing of the engine control output signal of the main engine control unit runs counter to the change or the amplitude value or the timing of the control unit over a predetermined time interval: for example, the auxiliary engine control unit continuously delays an ignition timing, while the main engine control unit continuously advances that ignition timing forwards; or the auxiliary engine control unit continuously reduces a throttle valve angle, while the main engine control unit continuously increases this throttle valve angle. This has the advantage that a potential error-prone, faulty, or dangerous overriding of the engine control output signal of the main engine control unit is effectively and efficiently prevented.

In another advantageous embodiment, the control unit is an adaptive control unit. In this case, the control unit is then presently also configured to adapt the stored control scheme on the basis of the signals output via the output signal interface unit and/or the signals received via the input signal interface unit according to a predetermined learning algorithm. In particular, the stored control scheme may then be carried out with respect to one or more predetermined optimization parameters, for example, a torque response and/or fuel consumption and/or an exhaust gas composition. This has the advantage that the control of the internal combustion engine may be individually adapted and optimized to the operating scenario relevant for the respective internal combustion engine, wherein dangerous states may be excluded in that the main engine control unit takes precedence over the auxiliary engine control unit in case of doubt.

Another aspect relates to an engine control system with a main engine control unit and with an auxiliary engine control unit according to one of the preceding embodiments, and an internal combustion engine with a main engine control unit and with an auxiliary engine control unit according to one of the preceding claims. One aspect also relates to a vehicle with an auxiliary engine control unit according to one of the described embodiments.

Another aspect is also a method for controlling an internal combustion engine of a vehicle coupled to a main engine control unit by means of an auxiliary engine control unit. One method step is thereby intercepting at least one engine control output signal of the main engine control unit by the auxiliary engine control unit. Another method step is changing the intercepted engine control output signal by the auxiliary engine control unit according to a predetermined control scheme. A third method step is outputting the changed engine control output signal to the internal combustion engine and thus controlling the internal combustion engine by the auxiliary engine control unit.

Advantages and advantageous embodiments of the method correspond to advantages and advantageous embodiments described for the auxiliary engine control unit.

The features and combinations of features, previously listed in the description, and in the introductory part, and the features and combinations of features subsequently mentioned in the description of the FIGURE and/or only shown in the FIGURE are applicable, not only in the respectively indicated combination, but also in other combinations, without leaving the scope of the invention. Thus, embodiments of the invention are also to be considered as comprised and disclosed, which are not explicitly shown or explained in the FIGURE; however, arise and are producible by separate combinations of features or from the explained embodiments. Embodiments and combinations of features are also to be considered disclosed that thus do not have all features of one of the originally formulated independent claims. In addition, embodiments and combinations of features are to be considered disclosed, in particular by the embodiments explained above, which exceed the combinations of features represented in the references of the claims or deviate from the same.

DESCRIPTION OF THE FIGURES

The subject matter according to the invention will be explained in greater detail on the basis of the schematic drawings shown in following FIGURES, without wishing to be limited to the specific embodiments shown here.

FIG. 1 thereby shows a schematic depiction of one exemplary embodiment of an auxiliary engine control unit with a main engine control unit and an internal combustion engine in a vehicle.

DETAILED DESCRIPTION

An auxiliary engine control unit 1 with a main engine control unit 2 and an internal combustion engine 3 of a vehicle (not shown) is shown in FIG. 1. Main engine control unit 2 is thus presently coupled to internal combustion engine 3 via auxiliary engine control unit 1. Auxiliary engine control unit 1 thereby has an input signal interface unit 4, which is configured to intercept an engine control output signal 5 of main engine control unit 2, in this case, an ignition timing t. Furthermore, auxiliary engine control unit 1 also has a control unit 6 which is configured to change intercepted engine control output signal 5 according to a predetermined control scheme stored in control unit 6. Finally, auxiliary engine control unit 1 also has an output signal interface unit 7 which is configured to output engine control output signal 5', presently a delayed ignition timing t' changed by control unit 6, to internal combustion engine 3 to be controlled.

In the example shown, input signal interface unit 4 is also configured to tap at least one engine control input signal 8 of main engine control unit 2, presently an engine speed rpm, wherein the control scheme stored in control unit 6 is functionally dependent on intercepted engine control input signal 8. Furthermore, input signal interface unit 4 is also presently configured to tap at least one additional sensor signal 9 from an additional sensor 10, which is presently assigned to internal combustion engine 3. The stored control scheme correspondingly also presently functionally depends on intercepted additional sensor signal 9, in this case, pressure P.

In the example shown, engine control output signal 5 represents an ignition timing t, i.e., a voltage peak which generates an ignition spark at timing t according to main control unit 2. This engine control output signal 5 is, as made clear by the crossed out dashed arrow, is now no longer directly forwarded to internal combustion engine 3, but rather is intercepted instead by auxiliary engine control unit 1 through input signal interface unit 4 and modified by control unit 6. In the present case, a voltage maximum value, the peak, of engine control output signal 5 is delayed by a predetermined time Δt so that, using changed engine control output signal 5' subsequently output via output signal interface unit 7, an ignition at delayed relative timing t' is generated in internal combustion engine 3.

In the example shown, intercepted engine control input signal 8 comprises an engine speed rpm and additional sensor signal 9 comprises a pressure P in the combustion chamber, so that the changing of engine control output signal 5 by control unit 6 may be carried out particularly precisely. A particularly effective feedback for a learning algorithm in control unit 6 may be achieved using the intercepted engine control input signal and additional sensor signal 9, so that the control of internal combustion engine 3 may be particularly effectively improved again using an adaptive control unit 6.

The invention claimed is:

1. An auxiliary engine control unit for use with a main engine control unit for an internal combustion engine of a vehicle, comprising:

an input signal interface unit, which is configured to intercept at least one engine control output signal of the main engine control unit;

a control unit which is configured to change the intercepted engine control output signal according to a control scheme stored in the control unit; and an output signal interface unit which is configured to output the engine control output signal, changed by the control unit, to the internal combustion engine to be controlled, wherein the input signal interface unit is configured for tapping at least one engine control input signal of the main engine control unit and the stored control scheme is functionally dependent on the intercepted engine control input signal, wherein the engine control input signal represents a pressure in the combustion chamber and/or an exhaust-side gas mixture pressure.

2. The auxiliary engine control unit according to claim 1, wherein the at least one engine control output signal of the main engine control unit is respectively present in the form of a voltage.

3. The auxiliary engine control unit according to claim 1, wherein the at least one engine control output signal of the main engine control unit represents a throttle valve position and/or a starting time for an injection process and/or a duration of the injection process and/or an ignition timing and/or a valve opening and closing time and/or a turbocharger charge specification.

4. The auxiliary engine control unit according to claim 1, wherein the change comprises a change of an amplitude value of the engine control output signal, in particular a change of a voltage maximum value and/or a change of a time characteristic of the engine control output signal, in particular a change of a time characteristic for a voltage maximum value.

5. The auxiliary engine control unit according to claim 4, wherein the control unit is configured, when the change of the time characteristic comprises a temporal advancement of a voltage maximum value, to output the changed engine control output signal to the internal combustion engine in form of the accelerated voltage maximum value only in a subsequent, in particular, in the next operating cycle of the internal combustion engine.

6. The auxiliary engine control unit according to claim 1, wherein the control unit is configured to change the intercepted engine control output signal at most by a predetermined limit amount, in particular by a limit amount specifically predetermined for the respective engine control output signal.

7. The auxiliary engine control unit according to claim 1, wherein the engine control input signal additionally represents, in particular, an engine rpm and/or a throttle valve position and/or a start time of an injection process and/or a duration of the injection process and/or a residual combustion gas amount and/or an ignition timing and/or a valve opening and valve closing time and/or turbocharger charge specification and/or an engine temperature and/or an intake-side gas mixture pressure and/or an engine torque and/or an engine mileage.

8. The auxiliary engine control unit according to claim 1, wherein the input signal interface unit is configured for tapping at least one additional sensor signal, which may be provided wirelessly and/or hardwired from one additional sensor of the internal combustion engine and/or of the vehicle and/or of a surroundings of the vehicle to the auxiliary engine control unit.

9. The auxiliary engine control unit according to claim 1, wherein the control unit is an adaptive control unit which is configured to adapt the stored control scheme on the basis of the signals output via the output signal interface unit and/or received via the input signal interface unit according to a predetermined learning algorithm, in particular to optimize the stored control scheme with respect to one or more predetermined optimization parameters, in particular a torque response and/or fuel consumption and/or an exhaust gas composition.

10. An engine control system or the internal combustion engine with the main engine control unit and with the auxiliary engine control unit according to claim 1.

11. A vehicle with an auxiliary engine control unit according to claim 1.

12. A method for controlling an internal combustion engine of a vehicle coupled to a main engine control unit via an auxiliary engine control unit, with the method steps:

intercepting at least one engine control output signal of the main engine control unit;

changing the intercepted engine control output signal according to a predetermined control scheme; and outputting the changed engine control output signal to the internal combustion engine and thus controlling the internal combustion engine, and tapping at least one engine control input signal of the main engine control unit, wherein the stored control scheme is functionally dependent on the intercepted engine control input signal, and wherein the engine control input signal represents a pressure in the combustion chamber and/or an exhaust-side gas mixture pressure.

* * * * *